United States Patent [19]

Maeno

[11] Patent Number: 5,283,644
[45] Date of Patent: Feb. 1, 1994

[54] CRIME PREVENTION MONITOR SYSTEM

[75] Inventor: Yoshinori Maeno, Kashiwa, Japan

[73] Assignee: Ibaraki Security Systems Co., Ltd., Japan

[21] Appl. No.: 910,958

[22] Filed: Jul. 9, 1992

[30] Foreign Application Priority Data

Dec. 11, 1991 [JP] Japan .................................. 3-327825

[51] Int. Cl.⁵ .............................................. H04N 7/18
[52] U.S. Cl. ......................................... 348/152; 382/2
[58] Field of Search ...................... 358/108, 93; 382/2

[56] References Cited

U.S. PATENT DOCUMENTS

| | | | |
|---|---|---|---|
| 3,564,132 | 2/1971 | Baker | 358/108 |
| 3,805,238 | 4/1974 | Rothfjell | 382/2 |
| 4,438,824 | 3/1984 | Mueller-Schloer | 340/825.34 |
| 4,449,189 | 5/1984 | Feix | 381/41 |
| 4,581,634 | 4/1986 | Williams | 358/108 |
| 4,703,347 | 10/1987 | Yasuda | 358/108 |
| 4,754,487 | 6/1988 | Newmuis | 382/2 |
| 4,821,118 | 4/1989 | Lafreniere | 358/108 |
| 4,858,000 | 8/1989 | Lu | 382/2 |
| 4,975,969 | 12/1990 | Tal | 382/2 |
| 4,993,068 | 2/1991 | Piosenka | 382/2 |
| 5,012,522 | 4/1991 | Lambert | 382/2 |

FOREIGN PATENT DOCUMENTS

| | | |
|---|---|---|
| 62-251899 | 11/1987 | Japan . |
| 63-238695 | 10/1988 | Japan . |
| 2-183395 | 7/1990 | Japan . |
| 2-220197 | 9/1990 | Japan . |
| 2231699 | 11/1990 | United Kingdom ................ 382/2 |

OTHER PUBLICATIONS

"Automated video monitoring system", IBM Technical Disclosure Bulletin vol. 18, No. 7, pp. 2280-2281, Dec. 1975.

*Primary Examiner*—Tommy P. Chin
*Assistant Examiner*—Bryan S. Tung
*Attorney, Agent, or Firm*—Diller, Ramik & Wight

[57] ABSTRACT

A crime prevention monitor system which, when detecting an intruder entering into a monitor region, automatically judges quickly and reliably whether or not the intruder is an illegally intruding person on the side of its concentrator center and if so, then issues a highly reliable report to such a restraint organization as a police station. In the system, an image database having image data of authorized persons for the respective monitor regions previously registered therein is provided in the concentrator center so that, when the intruder is present in the monitor region, the image data of the intruder is sampled through a monitor camera and collated with the image data of the authorized persons of the monitor region in question, whereby, when the intruder does not correspond to any of the authorized persons of the associated monitor region, the system determines that the intruder is illegal and reports the presence of the intruder to the restraint organization.

16 Claims, 4 Drawing Sheets

DECEMBER 10, 1991

XYZ SECURITY COMPANY
TEL : XXX-YYY-ZZZ

WE HEREBY REPORT THAT AN INTRUDER
WHO MIGHT BE AN ILLEGAL INTRUDER WAS
FOUND, WHICH DETAILS ARE AS FOLLOWS.

REMARKS

INTRUDED PLACE

ADDRESS : DDD OFFICE
                 CCC BUILDING, 4TH FLOOR
                 2-3, BBB 1-CHOME,
                 AAA-KU, TOKYO

TELEPHONE : 03-3456-7890

FEATURES : PRESIDENT ROOM LOCATED RIGHTWARD
                  DEEP FROM ENTRANCE, WITH A LARGE
                  WINDOW FACING EAST

INTRUSION TIME : 23:11

INTRUDER'S FACE PICTURE MODEL

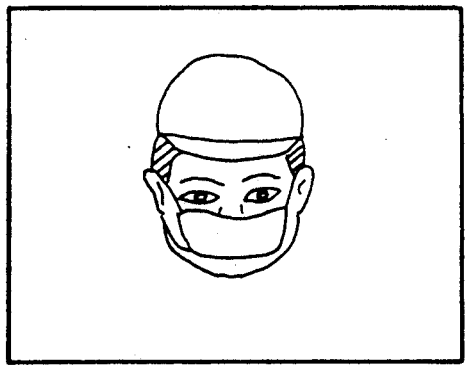

FIG. 4

CRIME PREVENTION MONITOR SYSTEM

BACKGROUND OF THE INVENTION

1. Field of the Invention

The present invention relates to a crime prevention monitor system which monitors, on a remote control basis, the presence or absence of an illegal intruder entering into a monitor region to be monitored, such as an office, a shop, a school, a bank or a factory, on the basis of a picture signal received from a monitor camera installed in the monitor region for photographing the intruder.

2. Description of the Related Art

There has been so far well known such a sort of crime prevention system that a thermal radiation sensor or an infrared ray sensor is previously set in a monitor region to be watched so that when an intruder entering into the monitor region is detected by the sensor, the presence of the intruder is automatically reported to a concentrator installed in a security company and the like through a public line or a private line. With such a system, a guard of the security company rushes to the monitor region in question on the basis of the automatic report to the concentrator and when recognizing the abnormality on the spot, he or she quickly informs such a predetermined organization as a police station or a fire station of the abnormality.

The aforementioned crime prevention sensor and concentrator are usually interconnected by means of a transmitter which has a function of automatically calling the public or private line and by means of a receiver which enables communication of the transmission line in response to the calling of the transmitter through the line and sends a report signal received thereafter to the concentrator. When the crime prevention sensor detects the intruder entering into the monitor region, the following procedure is carried out and an automatic report to the concentrator is realized.

(1) The transmitter is started on the basis of an intruder detection signal received from the crime prevention sensor.

(2) The started transmitter automatically calls the receiver installed in the security company or the like.

(3) This results in the transmission line connected between the transmitter and the receiver being placed in its communication enable state.

(4) A predetermined report signal having identification data, etc. of the monitor region included therein is transmitted from the transmitter to the receiver.

(5) The transmitted report signal is demodulated at the receiver in a predetermined manner and then applied to the concentrator.

In this way, the prior art system can detect the presence or absence of the intruder entering into the monitor region accurately to a certain extent so long as the crime prevention sensor is high in detection accuracy. However, since the presence or absence of the intruder is judged only by the crime prevention sensor, when the intruder is one of authorized persons for the monitor region or when a mouse, a dog, a cat or a bird is detected as an intruder or when the aforementioned transmitter, receiver, etc. including the sensor are erroneously operated, for example, the system issues an erroneous report signal with a very low reliability. As a result, even when the above report is issued through a so-called terminal apparatus including the crime prevention sensor and transmitter disposed in the monitor region, the guard cannot determine that the report is actually correct until he rushes to the on-site monitor region and actually confirms the situation.

Further, with such a system, even when the above report is correct, the guard must confirm the on-spot situation, which inevitably requires a time loss until confirmation of the situation.

There has been recently proposed a crime prevention monitor system which can cope with such a situation as to require emergent confirmation with an improved reliability, and in which a monitor camera such as an industrial television (ITV) camera, is also installed in a monitor region to be guarded so that a picture signal from the monitor camera and the aforementioned report signal are transmitted from a terminal apparatus to a concentrator, whereby a watchman on at the concentrator can monitor the received picture image on a suitable display unit and can confirm the on-spot situation substantially on a real time basis. This crime prevention monitor system, however, has been disadvantageous in that it is hard for the watchman to judge whether or not the intruder into the monitor region is one of authorized persons therefor in actual situations because he usually cannot know substantially all information of the monitor region, which means that such a picture image is not effectively utilized.

As the number of terminal apparatuses increases not only the intruder detection and report accuracy of the crime prevention monitor system; but also its reliability; becomes very vital.

SUMMARY OF THE INVENTION

In view of such circumstances, it is an object of the present invention to provide a crime prevention monitor system in which, when an intruder entering into a monitor region is detected, a concentrator center can automatically judge quickly and reliably whether or not the detected intruder is really illegal and if so, can inform a restraint organization, such as a police station; of a reliable report.

In accordance with an aspect of the present invention, the above object is attained by providing a crime prevention monitor system which comprises a terminal apparatus for generating monitor data on a monitor region to be monitored on the basis of a picture signal indicative of an intruder photographed by a monitor camera installed in the monitor region and for sending the generated monitor data onto a predetermined transmission line; and a concentrator for performing concentrating operation over the monitor data received through the transmission line to generally manage the monitor data of one or a plurality of the monitor regions on a remote control basis.

In more detail, the terminal apparatus of the system comprises:

(a) sensor means provided in the monitor region for detecting the presence or absence of the intruder entering into the monitor region;

(b) monitor controller means for starting the monitor camera on the basis of the presence of the intruder detected by the sensor means and for sequentially receiving the picture signal photographed by the monitor camera therefrom;

(c) image processing means for converting the received picture signal into image data;

(d) identification data setting means for previously setting identification data for the monitor region;

(e) timer means for outputting time data; and means (f) first report controller means, in response to the detection of the presence of the intruder by the sensor means, for acquiring the time data of the timer means, calling the concentrator through the transmission line, forming the monitor data on the basis of the converted image data, the identification data of the monitor region and the acquired time data, and sending the formed monitor data to the caller concentrator.

The concentrator comprises:

(g) image demodulator means for separating the image data from the monitor data received from the terminal apparatus and demodulating the image data;

(h) identification data extractor means for extracting the identification data of the monitor region from the received monitor data;

(i) an image database for previously registering therein image data of authorized persons with respect to the respective monitor regions;

(j) image collator means for collating the demodulated image data with all the image data of the authorized persons of one of the monitor regions specified by the extracted identification data among the image data registered in the image database and for outputting a matching signal indicative of a coincidence when the demodulated image data coincides with the image data of any of the authorized persons and outputting a non-matching signal indicative of a non-coincidence when the demodulated image data fails to coincide with the image data of any authorized persons; and (k) second report controller means, when the image collator means outputs the non-matching signal, for calling a receiver previously installed in a restraint organization, forming together with the time data emergent report data informing the presence of the illegal intruder into the monitor region specified by the identification data extracted from the monitor data, and sending the formed emergent report data to the caller receiver.

The terminal apparatus comprising the aforementioned means (a) through (f), when the intruder enters into the monitor region, converts intruder's face, attitude, behaviors, etc. into image data and transmits as the monitor data the image data together with the identification data of the monitor region and the intrusion time data thereof from the first report controller means (f) to the concentrator.

On the other hand, the concentrator, when receiving the monitor data, separates the image data, identification data and time data from the received monitor data. In particular, the image data separated and demodulated through the image demodulator means (g) is collated at the image collator means (j) with the image data previously registered in the image database (i).

The image data base (i) previously registers therein the image data of the authorized persons as, e.g., face picture data with respect to the respective monitor regions. The image collator means (j) retrieves from the image database (i) all image data registered for the monitor region specified by the identification data extracted through the identification data extractor means (h) and sequentially collates the retrieved image data with the demodulated image data received from the terminal apparatus. In this case, the image collator means (j), for example, performs the following operations (1) through (4).

(1) Extracts a plurality of still images from the demodulated image data.

(2) Further extracts face parts from the plurality of extracted still images.

(3) Generates a face picture model from the extracted face part images.

(4) Overlaps the corresponding images of the image data registered in the image database (i) on the generated face picture model and judges the coincidence or non-coincidence on the basis of extracted contours and features of the overlapped images.

The image collator means judges, on the basis of the extracted contour and feature parts of the overlapped images, whether or not the demodulated image data corresponds to any of the registered authorized persons. When determining a coincidence therebetween, the image collator means outputs the matching signal and when determining a non-coincidence, outputs the non-matching signal.

Only when the non-matching signal is issued from the image collator means (j) based on the image collation result of the collator means, that is, only when it is determined that the intruder does not correspond to any of the authorized persons for the monitor region, the image collator means (j) determines that the intruder is illegal and the second report controller means (k) informs the restraint organization of the presence of the illegal intruder in the form of the above emergent report data, which results in that its reliability becomes very high.

In the case where the receiver previously installed in the restraint organization is such an image receiver as a facsimile machine and the second report controller means (k) forms, as the emergent report data to be transmitted, image data (including character data, of course) converted in a predetermined manner based on the image data demodulated from the monitor data, the identification data extracted from the monitor data and the time data contained in the monitor data, the contents of the emergent report data becomes very informative, which can contribute, for example, to the arrest of the illegal intruder.

Further, in the case where it is desired to transmit such emergent image report data, in particular, the concentrator further includes (l) identification data related database for previously registering therein related data indicative of addresses of buildings located within the monitor regions, location telephone numbers of the monitor regions in the buildings and features of the monitor regions in association with the identification data and also includes (m) identification data processor means for retrieving the corresponding related data from the identification data related database on the basis of the extracted identification data, to add even the retrieved identification related data to the emergent report data formed through the second report controller means (k), whereby the contents of the emergent report data becomes further informative.

BRIEF DESCRIPTION OF THE DRAWINGS

FIG. 4 schematically shows an example of report data which is formed through a concentrator in the system of the embodiment and is transmitted to a restraint organization.

DESCRIPTION OF THE PREFERRED EMBODIMENT

Figure 1:
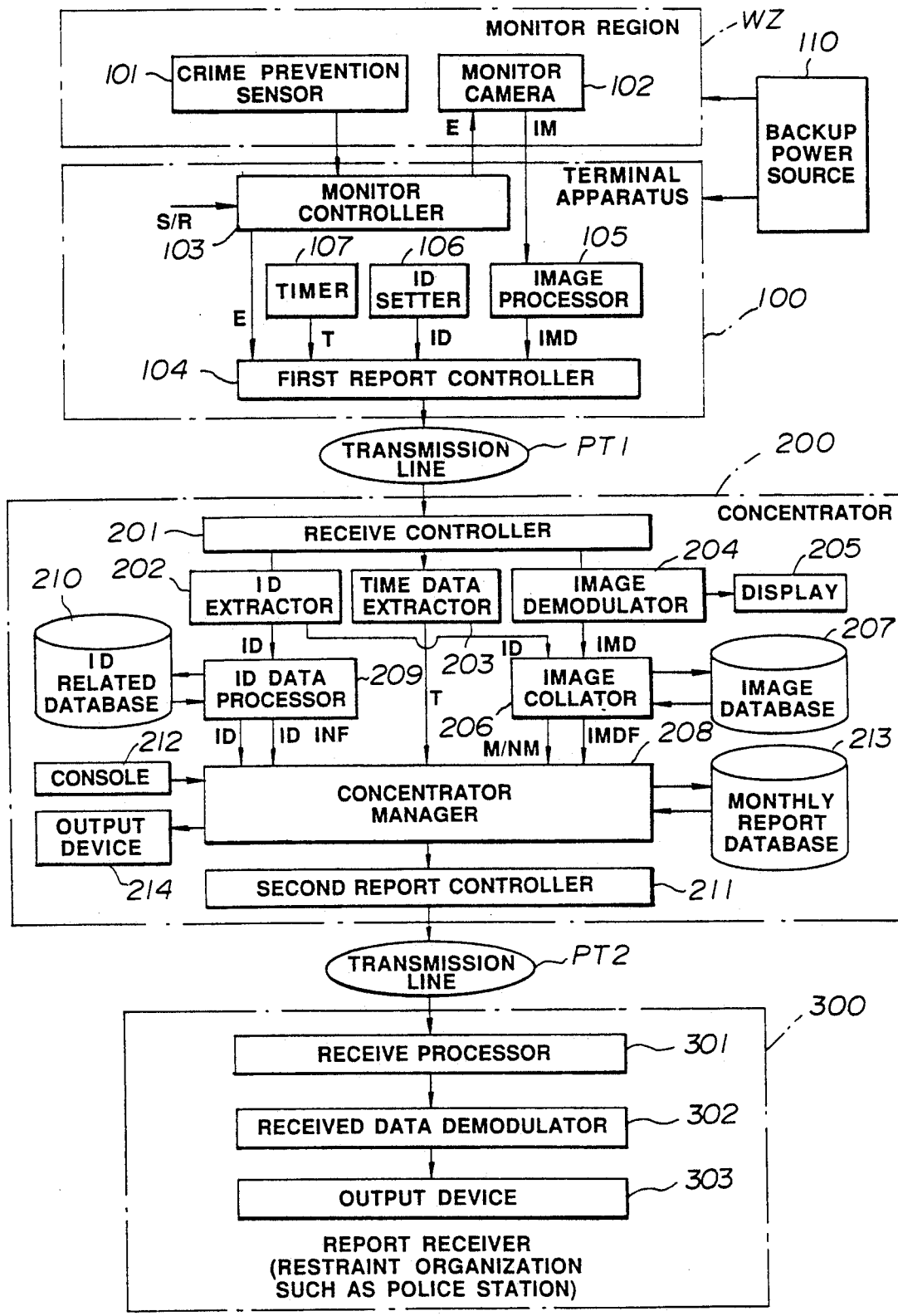
FIG. 1 is a block diagram of an arrangement of a crime prevention monitor system in accordance with an embodiment of the present invention.

Referring to FIG. 1, there is shown a crime prevention monitor system in accordance with an embodiment of the present invention.

As shown in FIG. 1, the system of the present embodiment comprises a terminal apparatus 100, a concentrator 200 and a report receiver 300, which are all interconnected by means of transmission lines PT1 and PT2.

The terminal apparatus 100 is installed in regions of a house or building to be monitored, such as an office, a shop, a school, a bank or a factory. Installed for each of zones or regions WZ to be monitored or watched is a crime prevention sensor 101 for detecting an intruder entering into the associated region; such as a thermal radiation sensor or an infrared ray sensor; and a monitor camera 102 for photographing the intruder; such as an industrial television (ITV) camera, so that a detection signal obtained from the crime prevention sensor 101 and an image signal obtained from the monitor camera 102 are input to the associated terminal apparatus 100.

The concentrator 200, is installed, for example, in a security company or the like, and collectively receives monitor data reported from the terminal apparatuses 100 provided in a multiplicity of monitor regions through the transmission line PT1 and generally monitors on a remote control basis the presence or absence of an illegal intruder entering into the regions WZ under monitor. The concentrator 200, when determining the presence of an intruder in the monitor region WZ on the basis of its monitor result, informs the report receiver 300 of the fact through the transmission line PT2.

The report receiver 300 is disposed in a restraint organization, such as a police station. It is assumed, that image transfer based on facsimile can be carried out between the concentrator 200 and the report receiver 300, that is, image data relating to the face picture of the intruder including character data indicative of the address and telephone number of the monitor region in question, an intrusion time, the features of the monitor region is sent as its report data on a facsimile transmission basis to the restraint organization.

Detailed explanation will then be sequentially made as to the specific structures of these devices of FIG. 1 and operations thereof.

When a person enters into the monitor region WZ shown in FIG. 1, the presence of the intruder is detected by the crime prevention sensor 101, regardless of the fact that the person entering into the monitor region WZ is authorized or not. A detection signal issued from the crime prevention sensor 101 is sent to a monitor controller 103 of the terminal apparatus 100.

The monitor controller 103 is switched to its watch set or release state in response to a received signal S/R which changes its state according to the watch setting or resetting operation of a suitable switch means (not shown). Assuming that the monitor controller 103 is in its watch set state, that is, a dweller or a company employee of the monitor region WZ previously sets the switch means in its set mode to guard the monitor region WZ in the nighttime, the monitor region WZ is remotely watched or monitored under control of the concentrator 200. Then the monitor controller 103, when responding to a reception of the detection signal from the crime prevention sensor 101, issues a start signal E to the monitor camera 102 and a first report controller 104 to put the camera and controller in their active state.

The monitor camera 102 thus set in its active state starts its photographing operation of an intruder entering into the monitor region WZ and sends an intruder's image signal IM to an image processor 105. In this connection, the monitor camera 102 can complete its photographing operation over the intruder in a time period of several scores of seconds even in the nighttime.

The image processor 105 receiving the image signal IM in this manner has a well known structure which includes various sorts of devices including, for example, an analog/digital (A/D) converter for converting the image signal IM into predetermined image data signal and an image memory for temporary storage. The image signal IM indicative of the intruder taken by the monitor camera 102 is processed at the image processor 105 into image data IMD that is processable by a computer or the like. The image data IMD is then sent from the image processor 105 to the first report controller 104.

Meanwhile, the first report controller 104; when controllably put in its active state by the start signal E received from the monitor controller 103 as in the monitor camera 102, calls the concentrator 200 through the transmission line PT1, during which the first report controller 104 receives an identification (ID) number of the monitor region WZ in question from a monitor-region ID setter 106, receives from a timer 107 time data T indicative of a time when receiving the start signal E, i.e., when the crime prevention sensor 101 detects the intruder, also receives the image data IMD indicative of the intruder image from the image processor 105, and generates monitor data on the basis of these input data. When the first report controller 104 secures a logical interconnection to the concentrator 200 through the aforementioned calling operation, the first report controller 104 sends the generated monitor data to the concentrator 200.

The monitor-region ID setter 106 sets the unique ID number for the monitor region WZ on a hardware basis by means of dip switch or the like or on a software basis by means of an ID number setting program, while the timer 107 is a known device which outputs time data based on the oscillating operation of a crystal oscillator or the like. Any of the monitor-region ID setter 106 and timer 107 may be incorporated in the monitor controller 103 or in the first report controller 104.

Any of the constituent parts of the terminal apparatus 100 is arranged so that a backup power supply 110 can back up the necessary power supply of the constituent parts at all times to maintain their functions even in case a power failure or the like causes stoppage of their power supply.

The concentrator 200, when the first report controller 104 of the terminal apparatus 100 transmits the monitor data to the concentrator 200 through the transmission line PT1, receives the monitor data at a receive controller 201 therein.

The receive controller 201, in response to the call from the first report controller 104, controls the transmission line PT1 to secure a logical interconnection to the associated terminal apparatus. Thereafter, the receive controller 201, when receiving the above monitor data from the first report controller 104 of the terminal apparatus, demodulates the received monitor data into a demodulated signal and outputs the demodulated signal to an ID extractor 202, a time data extractor 203 and an image demodulator 204, respectively.

More specifically, the ID extractor 202 extracts the aforementioned ID number data ID of the monitor region WZ having the intruder entered therein from the demodulated signal, the time data extractor 203 extracts the aforementioned intrusion time data T from the demodulated signal, and the image demodulator 204 extracts the aforementioned image data part of the intruder from the demodulated signal, demodulates the image data that is usually subjected to a compression for the transmission into such image data IMD as to be processable by the computer. The demodulated image data IMD is then sent to a display 205 where the intruder's behaviors are displayed thereon as a real time image, and also sent to an image collator 206 to be collated with image data previously registered in an image database 207.

The image database 207 previously registers therein image data concerning authorized persons with respect to different monitor regions. The image collator 206 collates the above demodulated image data IMD with all image data of the authorized persons of one of the monitor regions specified by the ID number data ID extracted through the ID extractor 202 among the image data previously registered in the image database 207, and when finding any coincidence between the demodulated image data IMD and the authorized persons image data, outputs a matching signal M indicative of the coincidence and when failing to find any coincidence therebetween, outputs a non-matching signal NM indicative of the non-coincidence to a concentrator manager 208. An example of the image collating operation of the image collator 206 and image database 207 will be further detailed by referring also to FIG. 2.

Figure 2:
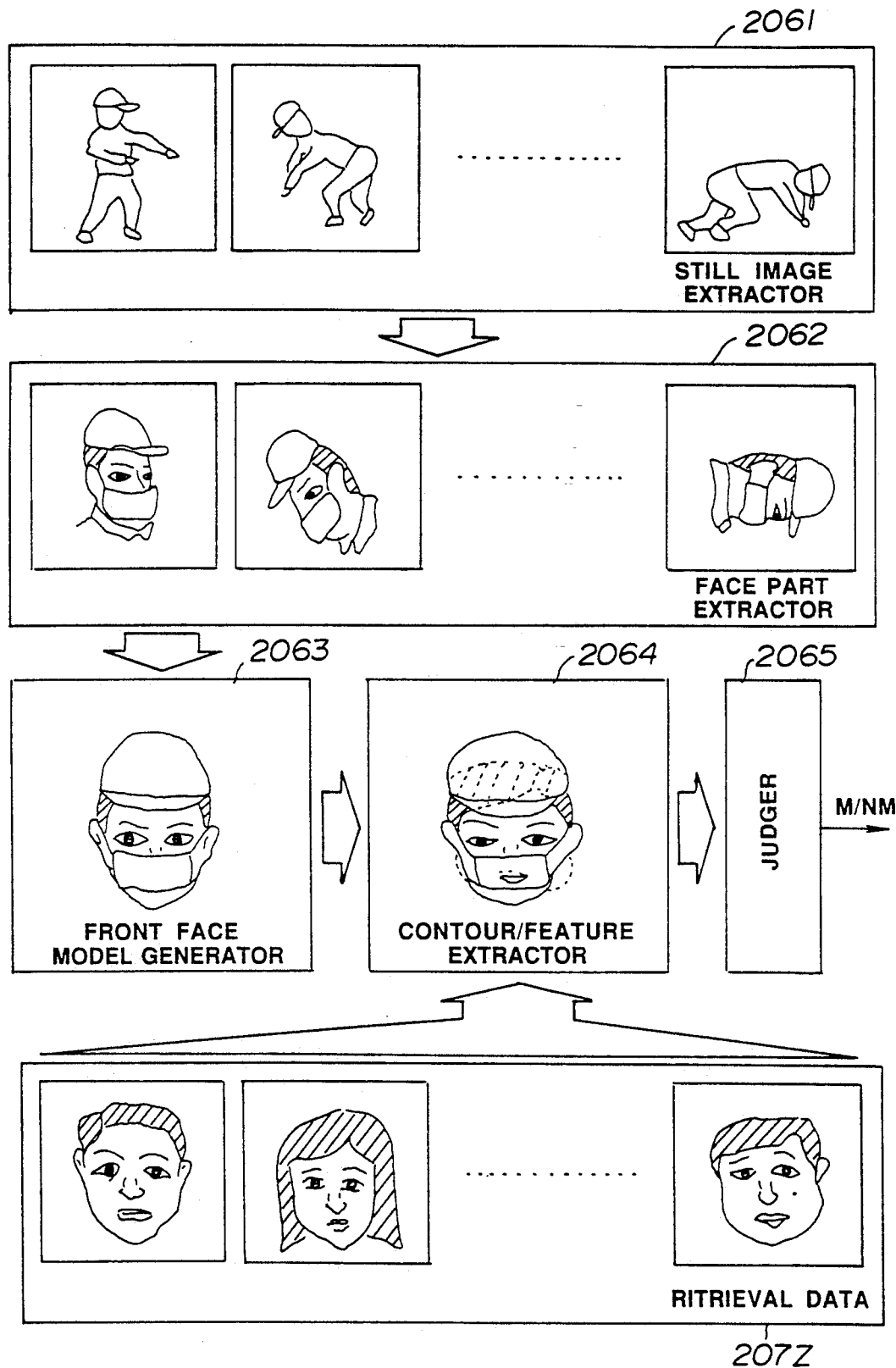
FIG. 2 is a schematic diagram showing an example of the function and processing manner of an image collator in FIG. 1.

In the illustrated example, it is assumed that the image data previously registered in the image database 207 are indicative of the face pictures of the respective authorized persons, and that one of the previously registered image data retrieved by the image collator 206 on the basis of the extracted ID number data ID, that is, the image data of the authorized persons being registered with respect to the monitor region WZ specified by the ID number data ID is shown by retrieved data 207Z in FIG. 2.

Then, the image collator 206 retrieves the image data 207Z, temporarily stores the retrieved data 207Z in a suitable image memory (not shown), and then sequentially performs the following operations (1) to (6).

(1) Extracts several still images from the demodulated image data IMD through a still image extractor 2061.

(2) Further extracts face parts from the extracted still images through a face part extractor 2062.

(3) Combines the extracted face part images through a front face model generator 2063 to generate a front face picture model.

(4) Reads in picture data (face picture data) of the retrieved data 207Z, overlaps the read-in picture on the generated front face picture model, and extracts contours and features between the overlapped images through a contour/feature extractor 2064.

(5) Judges at a judger 2065 on the basis of the extracted contours and features whether or not these are matched, that is, the overlapped images indicate one of the authorized persons.

(6) Repeats the above operations (4) and (5) over all the image data of the retrieved data 207Z.

When the judger 2065 determines all non-coincidences, that is, when the judger determines that the person indicative of the demodulated image data IMD does not correspond to any of the authorized persons of the associated monitor region WZ, the image collator 206 outputs to the concentrator manager 208 the non-matching signal NM together with face picture model data IMDF generated through the front face model generator 2063. On the other hand, the determination of the presence of at least one coincidence at the judger 2065 causes the image collator 206 to output to the concentrator manager 208 the matching signal M together with the generated face picture model data IMDF. It is assumed in the illustrated example that the person indicative of the image data IMD is an illegal intruder and the image collator 206 issues the non-matching signal NM. In this connection, such image collating operation as mentioned above per se can be completed in a short time of at most about 60 sec. through the introduction of an exclusive computer.

Meanwhile, in the concentrator 200, concurrently with the above image collating operation, retrieval for the related data is carried out through an ID data processor 209 and an ID related database 210 on the basis of the ID number data ID extracted at the ID extractor 202.

In more detail, the ID related database 210 previously registers therein related data indicative of addresses of buildings in these monitor regions and the location, telephone number and features of the monitor region in question in the building in association with the ID number data ID. The ID data processor 209 retrieves related data IDINF from the ID data related database 210 on the basis of the extracted ID number data ID. The thus-retrieved related data IDINF on the associated monitor region WZ is also output to the concentrator manager 208 through the ID data processor 209, together with its ID number data ID.

Figure 3:
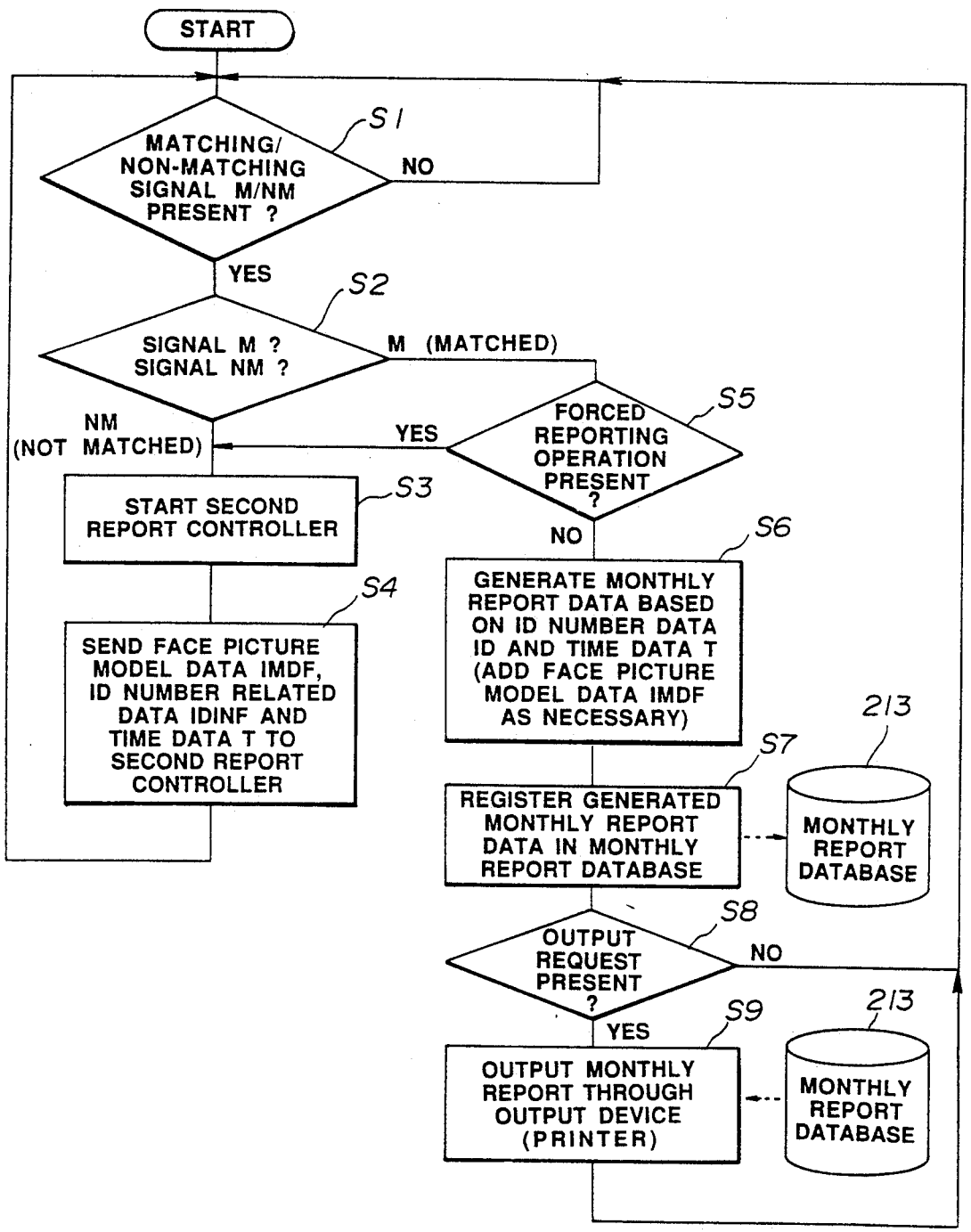
FIG. 3 is a flowchart for explaining an exemplary processing procedure of a second report controller in FIG. 1.

The concentrator manager 208 receives the non-matching signal NM (or matching signal M) from the image collator 206, receives the ID number data ID and the related data IDINF from the ID data processor 209 and also receives the extracted time data T from the time data extractor 203; and generally processes these received data in accordance with, for example, such a procedure as shown in FIG. 3.

More specifically, the concentrator manager 208 monitors the matching and non-matching signals M and NM received from the image collator 206 (step S1 in FIG. 3). The concentrator manager 208, when receiving the non-matching signal NM, as in the illustrated example (step S2 in FIG. 3), immediately starts a second report controller 211 (step S3 in FIG. 3) and sends the received intruder's face picture model data IMDF, ID number related data IDINF and time data T to the second report controller 211 (step S4 in FIG. 3).

The concentrator manager 208, even when receiving the natching signal M (step S2 in FIG. 3) by a guard or the like working in the concentrator center providing a forced reporting operation through a console 212 (step S3 in FIG. 3), immediately starts, as in the above case, the second report controller 211 (step S3 in FIG. 3) and sends the received intruder's face picture model data IMDF, ID number related data IDINF and time data T to the started second report controller 211 (step S4 in FIG. 3). That is, in the system of the present embodiment, since the intruder's behaviors are monitored on the display 205, even in the case where the matching signal M is issued from the image collator 206, when the guard judges that the intruder's behaviors are clearly suspicious, he or she can give the forced reporting operation through the console 212, whereby erroneous monitoring can be suppressed to its minimum level.

Otherwise, when the matching signal M is issued from the image collator 206 (step S2 in FIG. 3) and no forced reporting operation is carried out (step S5 in FIG. 3), the concentrator manager 208 starts its monthly report processing while not starting the second report controller 211.

The 'monthly report processing' as used herein refers to such processing that monitored results for every month are reported to a client who asked the crime prevention of his territory under control of the present system. In more detail, in the illustrated example, the concentrator manager 208, for example, generates monthly report data including the ID number data, time data and if necessary, intruder's face picture model data with respect to the different monitor regions on the basis of the received ID number data ID, time data T and if necessary, intruder's (entered person's) face picture model data IMDF (step S6 in FIG. 3), registers the generated monthly report data in a monthly report database 213 (step S7 in FIG. 3). When receiving an output request for the specified monitor region from the console 212 (step S8 in FIG. 3), the concentrator manager 208 reads out the monthly report data associated with the specified monitor region from the monthly report database 213 and outputs it in the form of data having a predetermined format through an output device 214, such as a printing device or printer (step S9 in FIG. 3).

Meanwhile, the second report controller 211, when started by the concentrator manager 208, calls the report receiver 300 located in such a restraint organization as a police station, forms the aforementioned monthly report data on the basis of the received intruder's face picture model data IMDF, ID number related data IDING and time data T and transmits the formed report data to the report receiver 300 through the secured transmission line PT2. The transmission of the report data through the transmission line PT2 is on a facsimile transmission basis, as already mentioned above.

When the report data is transmitted to the report receiver 300 in this manner, the report receiver 300 in turn receives the report data at a receive processor 301 therein. The report data is immediately demodulated at a received data demodulator 302 and then output to an output device 303. The contents of the print-out report data is shown in FIG. 4.

As shown in FIG. 4, the system transmits on a facsimile transmission basis from the report receiver 300 to the police station such report data that, in addition to a report date and a reporter name (security company), includes the following data (A), (B) and (C).

(A) ID number related data:
  The address of the monitor region into which the intruder entered.
  Its office name (such as householder, shop name, school name or company name).
  Telephone number.
  Features of the monitor region (such as room locations, surrounding circumstances or environment).
(B) Time data:
  Intrusion time.
(C) Intruder's face picture model data:
  Image data indicative of the generated intruder's face picture model.

The police station, when receiving the report data from the report receiver 300, can immediately grasp the contents correctly and cope with it (intruder's arrest).

Although the system has been arranged to send report data including the ID number related data, time data and intruder's face picture model data on a facsimile transmission basis, other suitable transmission technique and medium may be employed. For example, a suitable display unit under control of a computer can be installed even at the side of the report receiver 300 and the report data can be transmitted by an image transmission technique other than the facsimile transmission technique to be displayed on the display unit. In addition, the data to be transmitted to the report receiver 300 is not limited only to the image data but may be of a voice or character type as necessary. In particular, only when the system judges through the aforementioned image collating operation that the intruder does not correspond to any of the authorized persons of the associated monitor region, the system determines that the intruder is an illegal person and informs the restraint organization of the presence of the invader. As a result, even when the latter technique for not necessarily sending the image data to the report receiver 300 is employed, the report can be made very high in reliability.

Though it is assumed that the transmission lines PT1 and PT2 are general public lines in the system of the foregoing embodiment, other suitable private lines or radio lines may be employed.

Further, in the system of the foregoing embodiment, when the non-matching signal NM is issued from the image collator 206, this immediately causes the second report controller 211 to be started to report the presence of the illegal intruder to the restraint organization. However, a telephone automatic transmitter means for automatically calling a specified telephone set may be provided in the concentrator 200 so that, when the non-matching signal NM is issued, the telephone automatic transmitter means can automatically call the telephone set previously installed in the associated monitor region, and only when failing to receive a response to the calling from the intruder even after passage of a predetermined time, can cause the report controller 211 to be started. The employment of such an arrangement enables further suppression of an erroneous report possibility, from the viewpoint that the authorized person usually answers to such a call without any hesitation and that, when the aforementioned image collating operation is considerably high in accuracy but the intruder happened to be photographed in undesirable photographing conditions (as when intruder's face could not be photographed), its accurate collation becomes difficult.

The above explanation has been made on the assumption that the terminal apparatus 100 comprising the constituent parts 103 to 107 (including the monitor controller 103, the first report controller 104 and the timer 107) is provided for one monitor region having the crime prevention sensor 101 and the monitor camera 102 in a one-to-one (1:1) relation, but one terminal apparatus 100 may be provided for N (which is an integer of 2 or higher) of such monitor regions. In other words, so long as the monitor controller 103 can recognize one of the crime prevention sensors which issued the detection signal and one of the monitor cameras to be started and the ID number data of one of the monitor regions having the recognized crime prevention sensor and monitor camera installed therein can be incorporated into the aforementioned monitor data which is to be formed through the first report controller 104, even in the event where a plurality of monitor regions are previously registered for one subscriber (monitor client), the single terminal apparatus (comprising the constituent parts 103 to 107) may be commonly used with respect to the plurality of registered monitor regions each having the crime prevention sensor and monitor camera alone installed therein.

Further, in order to meet the circumstances of the respective monitor regions, the terminal apparatus 100 may be arranged to perform such reporting functions (1) to (5) other than the aforementioned reporting function as follows.

(1) Informs the concentrator 200 of the monitor data of the associated monitor region at every time previously set through a timer or the like.

(2) Performs monitor releasing operation over the monitor controller 103 (Sends a rest signal R to the monitor controller 103).

(3) Informs the concentrator 200 of the monitor data of the associated monitor region when the crime prevention sensor 101 detects an intruder, regardless of the set or reset state of the monitor controller 103.

(4) Informs the concentrator 200 of the monitor data of the monitor region in question when a power failure takes place.

(5) Informs the concentrator 200 of the monitor data of the associated monitor region when the power failure is recovered.

In the present invention, the aforementioned ID number data is used as identification data for each monitor region, the corresponding data, such as its address and telephone number, is retrieved from the ID related database 210 of the concentrator 200 on the basis of the ID number data and then added to the aforementioned report data. However, for example, these address and telephone number may be directly used as its identification data and sent from the terminal apparatus to be added to the report data. Or the ID number data may be used but may be converted into related data of the corresponding address and telephone number with use of a simple table provided, e.g., in the concentrator, and the converted data may be added to the report data. That is, with the crime prevention monitor system in accordance with the present invention, the configuration of the ID related database 210 is not restricted to the illustrated specific example.

The crime prevention monitor system of the present invention is not restricted to the specific arrangement of the foregoing description but may be modified in various ways without departing from the scope of the invention.

What is claimed is:

1. A crime prevention monitor system comprising:
a terminal apparatus for generating monitor data on a monitor region to be monitored on the basis of a picture signal indicative of an intruder photographed by a monitor camera installed stalled in the monitor region and for sending the generated monitor data onto a predetermined first transmission line;
a concentrator for performing a concentrating operation over the monitor data received through the first transmission line to generally manage the monitor data of one or a plurality of the monitor regions on a remote control basis and, when the presence of an illegal intruder is recognized at any one of the monitor regions in carrying out the concentrating operation, for generating emergent report data informing the presence of the illegal intruder and transmitting the emergent report data onto a predetermined second transmission line; and
a report receiver provided in a restraint organization such as a police station, for receiving the emergent report data sent through the second transmission line,
said terminal apparatus including:
sensor means provided in said monitor region for detecting presence or absence of the intruder entering into the monitor region;
monitor controller means for starting said monitor camera on the basis of the presence of the intruder detected by said sensor means and for sequentially receiving the picture signal photographed by said monitor camera therefrom;
image processing means for converting the received picture signal into image data;
identification data setting means for previously setting identification data for the monitor region;
timer means for outputting time data; and
first report controller means, in response to the direction of the presence of the intruder by said sensor means, for acquiring the time data of the timer means, calling said concentrator through said first transmission line, forming said monitor data on the basis of said converted image data, the identification data of the monitor region and the acquired time data, and sending the formed monitor data to the called concentrator,
said concentrator including:
image demodulator means for separating said image data from the received monitor data and demodulating the image data;
identification data extractor means for extracting the identification data of the monitor region from the received monitor data;
an image database for previously registering therein image data of authorized persons with respect to the respective monitor regions;
image collector means for collating said demodulated image data with all the image data of the authorized persons of one of the monitor regions specified said extracted identification data among the image data registered in said image database and for outputting a matching signal indicative of a coincidence when the demodulated image data coincides with the image data of any of the authorized persons and outputting a non-matching signal indicative of a non-coincidence when the demodulated image data fails to coincide with the image data of any of the authorized persons;
second report controller means, when the image collator means outputs said non-matching signal, for calling said report receiver through said second transmission line, forming together with said time data said emergent report data informing the presence of the illegal intruder into the monitor region specified by the identification data extracted from said monitor data, and sending the formed emergent report data to the called report receiver, and wherein the image data previously registered in said image database correspond to face pictures of the authorized persons, and said image collator means includes means for extracting a plurality of still images from said demodulated image data, means for further extracting face parts from the plurality of extracted still images, means for generating a face picture model from the extracted face part images, and means for overlapping the corresponding images of the image data registered in said image database on said face picture model and for judging said coincidence or non-coincidence of the basis of extracted contours and features of the overlapped images.

2. A crime prevention monitor system as set forth in claim 1, wherein said report receiver is an image receiver, and said second report controller means forms predetermined image data as said emergent report data on the basis of the image data demodulated from said monitor data, the identification data extracted from the monitor data and said time data included in said monitor data.

3. A crime prevention monitor system as set forth in claim 2, wherein said identification data is code data uniquely defined in said crime prevention monitor system, and said concentrator further includes an identification data related database for previously registering therein related data indicative of addresses of buildings located within the monitor regions, locations and telephone numbers of the monitor regions in the buildings and features of the monitor regions in association with the identification data and also includes identification data processor means for retrieving the corresponding related data from said identification data related database on the basis of said extracted identification data, and said second report controller means, when said image collator means outputs said non-matching signal, adds the retrieved identification data related data thereto to form said emergent report data.

4. A crime prevention monitor system as set forth in claim 3, wherein said concentrator further includes:
monthly report data forming means, when said image collator means outputs said matching signal for forming together with said time data and the retrieved identification data related data monthly report data recording that a person has entered into the monitor region specified by the identification data extracted from the monitor data;
monthly report database for registering therein the formed monthly report data for each of the monitor regions; and
output means, in response to an output request of the monthly report data made through suitable input means, for reading out from the monthly report database the monthly report data of the monitor region specified through said input means and for visually outputting the read-out monthly report data in a predetermined format.

5. A crime prevention monitor system comprising:
a terminal apparatus for generating monitor data on a monitor region to be monitored on the basis of a picture signal indicative of an intruder photographed by a monitor camera installed in the monitor region and for sending the generated monitor data onto a predetermined first transmission line;
a concentrator for performing a concentrating operation over the monitor data received through the first transmission line to generally manage the monitor data of one or a plurality of the monitor regions on a remote control basis and, when the presence of an illegal intruder is recognized at any one of the monitor regions in carrying out the concentrating operation, for generating emergent report data informing the presence of the illegal intruder and transmitting the emergent report data onto a predetermined second transmission line; and
a report receiver provided in a restraint organization such as a police station, for receiving the emergent report data sent through the second transmission line,
said terminal apparatus including:
sensor means provided in said monitor region for detecting presence or absence of the intruder entering into the monitor region;
monitor controller means for starting said monitor camera on the basis of the presence of the intruder detected by said sensor means and for sequentially receiving the picture signal photographed by said monitor camera therefrom;
image processing means for converting the received picture signal into image data;
identification data setting means for previously setting identification data for the monitor region;
timer means for outputting time data; and
first report controller means, in response to the direction of the presence of the intruder by said sensor means, for acquiring the time data of the timer means, calling said concentrator through said first transmission line, forming said monitor data on the basis of said converted image data, the identification data of the monitor region and the acquired time data, and sending the formed monitor data to the called concentrator,
said concentrator including:
image demodulator means for separating said image data from the received monitor data and demodulating the image data;
identification data extractor means for extracting the identification data of the monitor region from the received monitor data;
an image database for previously registering therein image data of authorized persons with respect to the respective monitor regions;
image collator means for collating said demodulated image data with all the image data of the authorized persons of one of the monitor regions specified by said extracted identification data among the image data registered in said image database and for outputting a matching signal indicative of a coincidence when the demodulated image data coincides with the image data of any of the authorized persons and outputting a non-matching signal indicative of a non-coincidence when the demodulated image data fails to coincide with the image data of any of the authorized persons;
second report controller means, when the image collator means outputs said non-matching signal, for calling said report receiver through said second transmission line, forming together with said time data said emergent report data informing the presence of the illegal intruder into the monitor region specified by the identification data extracted from said monitor data, and sending the formed emergent report data to the called report receiver, a display for visually displaying in a real time basis the image data separated and demodulated by the image demodulator means; and a console including at least input means (key means) through which a forced reporting operation is carried out, and wherein said second report controller means, when the forced reporting operation is carried out through the console, calls said report receiver through the second transmission line even if the matching signal indicative of the coincidence is issued from said image collator means, forms together with said time data the emergent report data informing the presence of the illegal intruder into the monitor region specified by the identification data extracted from said monitor data, and sends the formed emergent report data to the called report receiver.

6. A crime prevention monitor system as set forth in claim 5, wherein said concentrator further includes:

monthly report data forming means, when said image collator means outputs said matching signal and the forced reporting operation through the console is not carried out, for forming together with said time data monthly report data recording that a person has entered the monitor region specified by the identification data extracted from the monitor data;

monthly report database for registering therein the formed monthly report data for each of the monitor regions; and output means, in response to an output request of the monthly report data made through suitable input means, for reading out from said monthly report database the monthly report data of the monitor region specified through said input means and for visually outputting the read-out monthly report data in a predetermined format.

7. A crime prevention monitor system as set forth in claim 6, wherein said identification data is code data uniquely defined in said crime prevention monitor system, said concentrator further includes an identification data related database for previously registering therein related data indicative of addresses of building located within the monitor regions, locations and telephone numbers of the monitor regions in the buildings and features of the monitor regions in association with the identification data and identification data processor means for retrieving the corresponding related data from said identification data related database on the basis of said extracted identification data, and said monthly report data forming means, when said image collator means output said matching signal, adds the retrieved identification data related data thereto to form the monthly report data.

8. A crime prevention monitor system comprising:

a terminal apparatus for generating monitor data on a monitor region to be monitored on the basis of a picture signal indicative of an intruder photographed by a monitor camera installed in the monitor region and for sending the generated monitor data on to a predetermined first transmission line;

a concentrator for performing a concentrating operation over the monitor data received through the first transmission line to generally manage the monitor data of one or a plurality of the monitor regions on a remote control basis and, when the presence of an illegal intruder is recognized at any one of the monitor regions in carrying out the concentrating operation, for generating emergent report data informing the presence of the illegal intruder and transmitting the emergent report data onto a predetermined second transmission line; and a report receiver provided in a restraint organization such as a police station, for receiving the emergent report data sent through the second transmission line, said terminal apparatus including:

sensor means provided in said monitor region for detecting presence or absence of the intruder entering into the monitor region;

monitor controller means for starting said monitor camera on the basis of the presence of the intruder detected by said sensor means and for sequentially receiving the picture signal photographed by said monitor camera therefrom;

image processing means for converting the received picture signal into image data;

identification data setting means for previously setting identification data for the monitor region;

timer means for outputting time data; and first report controller means, in response to the direction of the presence of the intruder by said sensor means, for acquiring the time data of the timer means, calling said concentrator through said first transmission line, forming said monitor data on the basis of said converted image data, the identification data of the monitor region and the acquired time data, and sending the formed monitor data to the called concentrator, said concentrator including:

image demodulator means for separating said image data from the received monitor data and demodulating the image data;

identification data extractor means for extracting the identification data of the monitor region from the received monitor data;

an image database for previously registering therein image data of authorized persons with respect to the respective monitor regions;

image collator means for collating said demodulated image data will all the image data of the authorized persons of one of the monitor regions specified by said extracted identification data among the image data registered in said image database and for outputting a matching signal indicative of a coincidence when the demodulated image data coincides with the image data of any of the authorized persons and outputting a non-matching signal indicative of a non-coincidence when the demodulated image data fails to coincide with the image data of any of the authorized persons;

second report controller means, when the image collator means outputs said non-matching signal, for calling said report receiver through said second transmission line, forming together with said time data said emergent report data informing the presence of the illegal intruder into the monitor region specified by the identification data extracted from said monitor data, and sending the formed emergent report data to the called report receiver, monthly report data forming means, when said image collator means outputs said matching signal, for forming together with said time data monthly report data recording that a person has entered into the monitor region specified by the identification data extracted from the monitor data;

monthly report database for registering therein the formed monthly report data for each of the monitor regions; and output means, in response to an output request of the monthly report data made through suitable input means, for reading out from said monthly report database the monthly report data of the monitor region specified through said input means and for visually outputting the read-out monthly report data in a predetermined format.

9. A crime prevention monitor system comprising:

a terminal apparatus for generating monitor data on a monitor region to be monitored on the basis of a picture signal indicative of an intruder photographed by a monitor camera installed in the monitor region and for sending the generated monitor data onto a predetermined transmission line; and a concentrator for performing concentrating operation over the monitor data received through the transmission line to generally manage the monitor data of one or a plurality of the monitor regions on a remote control basis, said terminal apparatus including:

sensor means provided in said monitor region for detecting presence or absence of the intruder entering into the monitor region;

monitor controller means for starting said monitor camera on the basis of the presence of the intruder detected by said sensor means and for sequentially receiving the picture signal photographed by said monitor camera therefrom;

image processing means for converting the received picture signal into image data;

identification data setting means for previously setting identification data for the monitor region;

timer means for outputting time data; and first report controller means, in response to the detection of the presence of the intruder by said sensor means, for acquiring the time data of the timer means, calling said concentrator through said transmission line, forming said monitor data on the basis of said converted image data, the identification data of the monitor region and the acquired time data, and sending the formed monitor data to the called concentrator, said concentrator including:

image demodulator means for separating said image data from the received monitor data and demodulating the image data;

identification data extractor means for extracting the identification data of the monitor region from the received monitor data;

an image database for previously registering therein image data corresponding to face pictures of authorized persons with respect to the respective monitor regions;

image collator means for collating said demodulated image data with all the image data of the authorized persons of one of the monitor regions specified by said extracted identification data among the image data registered in said image database and for outputting a matching signal indicative of a coincidence when the demodulated image data coincides with the image data of any of the authorized persons and outputting a non-matching signal indicative of a non-coincidence when the demodulated image data fails to coincide with the image data of any of the authorized persons, said image collating means including means for extracting a plurality of still images from the demodulated image data, means for further extracting face parts from the plurality of extracted still images, means for generating a face picture model from the extracted face part images, and means for overlapping the corresponding images of the image data registered in the image database on said generated face picture model and for judging said coincidence of non-coincidence on the basis of extracted contours and features of the overlapped images; and second report controller means, when the image collator means outputs said non-matching signal, for calling a receiver previously installed in a restraint organization, forming together with said time data emergent report data informing the presence of the illegal intruder into the monitor region specified by the identification data extracted from said monitor data, and sending the formed emergent report data to the called receiver.

10. A crime prevention monitor system as set forth in claim 9, wherein said receiver previously installed in said restraint organization is an image receiver, and said second report controller means forms predetermined image data as said emergent report data on the basis of the image data demodulated from said monitor data, the identification data extracted from the monitor data and the time data included in the monitor data.

11. A crime prevention monitor system as set forth in claim 9, wherein said identification data is code data uniquely defined in said crime prevention monitor system, said concentrator further includes an identification data related database for previously registering therein related data indicative of addresses of buildings located within the monitor regions, locations and telephone numbers of monitor regions in the buildings and features of the monitor regions in association with the identification data and identification data processor means for retrieving the corresponding related data from said identification data related database on the basis of the extracted identification data, and said second report controller means, when said image collator means outputs said non-matching signal, adds the retrieved identification data related data thereto to form said emergent report data.

12. A crime prevention monitor system as set forth in claim 11, wherein said concentrator further includes:

monthly report data forming means, when said image collator means outputs said matching signal, for forming together with the time data and the retrieved identification data related data monthly report data recording that a person has entered into the monitor region specified by the identification data extracted from the monitor data;

monthly report database for registering therein the formed monthly report data for each of the monitor regions; and output means, in response to an output request of the monthly report data made through suitable input means, for reading out from said monthly report database the monthly report data of the monitor region specified through said input means and for visually outputting the read-out monthly report data in a predetermined format.

13. A crime prevention monitor system as set forth in claim 9, wherein said concentrator further includes:
a display for visually displaying in a real time basis the image data separated and demodulated by said image demodulator means; and
a console including at least input means (keying means) through which a forced reporting operation is carried out,
said second report controller means, when the forced reporting operation is carried out through the console, calls said receiver previously installed in the restraint organization even if the matching signal indicative of the coincidence is issued from said image collator means, forms together with said time data the emergent report data informing the presence of the illegal intruder into the monitor region specified by the identification data extracted from said monitor data, and sends the formed emergent report data to the called receiver.

14. A crime prevention monitor system as set forth in claim 13, wherein said concentrator further includes:
monthly report data forming means, when said image collator means outputs said matching signal and the forced reporting operation through said console is not carried out, for forming together with the time data monthly report data recording that a person has entered into the monitor region specified by the identification data extracted from the monitor data;
monthly report database for registering therein the formed monthly report data for each of the monitor regions; and
output means, in response to an output request of the monthly report data made through suitable input means, for reading out from said monthly report database the monthly report data of the monitor region specified through said input means and for visually outputting the read-out monthly report data in a predetermined format.

15. A crime prevention monitor system as set forth in claim 14, wherein said identification data is code data uniquely defined in the crime prevention monitor system,
said concentrator further includes an identification data related database for previously registering therein related data indicative of addresses of buildings located within the monitor regions, locations and telephone numbers of the monitor regions in the buildings and features of the monitor regions in association with the identification data and, identification data processor means for retrieving the corresponding related data from said identification data related database on the basis of the extracted identification data, and
said monthly report data forming means, when said image collator means outputs said matching signal, adds the retrieved identification data related data thereto to form said monthly report data.

16. A crime prevention monitor system as set forth in claim 9, wherein said concentrator further includes:
monthly report data forming means, when said image collator means outputs said matching signal, for forming together with said time data monthly report data recording that a person has entered into the monitor region specified by the identification data extracted from the monitor data;
monthly report database for registering therein the formed monthly report data for each of the monitor regions; and
output means, in response to an output request of the monthly report data made through suitable input means, for reading out from the monthly report database the monthly report data of the monitor region specified through said input means and for visually outputting the read-out monthly report data in a predetermined format.

* * * * *